(12) United States Patent
Lee et al.

(10) Patent No.: US 12,061,498 B2
(45) Date of Patent: Aug. 13, 2024

(54) FLEXIBLE DISPLAY APPARATUS

(71) Applicant: LG ELECTRONICS INC., Seoul (KR)

(72) Inventors: Haklim Lee, Seoul (KR); Samyoup Kim, Seoul (KR); Jiyong Shin, Seoul (KR); Sanghyuk Im, Seoul (KR); Jongbeom Han, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 279 days.

(21) Appl. No.: 17/615,901

(22) PCT Filed: Jun. 18, 2019

(86) PCT No.: PCT/KR2019/007329
§ 371 (c)(1),
(2) Date: Dec. 2, 2021

(87) PCT Pub. No.: WO2020/256171
PCT Pub. Date: Dec. 24, 2020

(65) Prior Publication Data
US 2022/0317732 A1 Oct. 6, 2022

(51) Int. Cl.
*G06F 1/16* (2006.01)
*H04M 1/02* (2006.01)
*G09F 9/30* (2006.01)

(52) U.S. Cl.
CPC .......... *G06F 1/1652* (2013.01); *G06F 1/1641* (2013.01); *H04M 1/021* (2013.01); *G06F 2203/04102* (2013.01); *G09F 9/301* (2013.01)

(58) Field of Classification Search
CPC ..... G06F 1/1652; G06F 1/1613; H04M 1/021
See application file for complete search history.

(56) References Cited

U.S. PATENT DOCUMENTS

| | | | |
|---|---|---|---|
| 2006/0007368 A1 | 1/2006 | Slikkerveer et al. | |
| 2016/0231843 A1* | 8/2016 | Kim | G06F 3/0412 |
| 2016/0357222 A1* | 12/2016 | Seo | G06F 1/1635 |
| 2017/0332496 A1* | 11/2017 | Choi | G06F 1/1652 |
| 2017/0364122 A1 | 12/2017 | Kim et al. | |
| 2018/0011510 A1* | 1/2018 | Choi | G06F 11/3089 |

(Continued)

FOREIGN PATENT DOCUMENTS

| KR | 10-2016-0017843 A | 2/2016 |
|---|---|---|
| KR | 10-2016-0047100 A | 5/2016 |

(Continued)

*Primary Examiner* — James Wu
*Assistant Examiner* — Dakota M Talbert
(74) *Attorney, Agent, or Firm* — Birch, Stewart, Kolasch & Birch, LLP

(57) ABSTRACT

The present invention relates to a flexible display apparatus which comprises: a body part having a polygonal prism shape; a flexible display part deformed by external force; and a frame part, which includes a plurality of segment plates arranged in parallel to one another, supports the flexible display part, and is configured to be wound around the outer surface of the body part or unwound, wherein, when the frame part is wound, the segment plates are disposed to surround the body part in a manner corresponding to a rolling radius, and when the frame part is unwound, segment plates neighboring each other come into close contact with each other.

14 Claims, 10 Drawing Sheets

(56) References Cited

U.S. PATENT DOCUMENTS

2018/0059727 A1\* 3/2018 Seo .................. G06F 1/1656
2018/0130974 A1\* 5/2018 Koo ................ G02F 1/133308
2021/0056874 A1\* 2/2021 Morin .................. G06F 1/1601

FOREIGN PATENT DOCUMENTS

| KR | 10-2016-0098677 A | 8/2016 | | |
|----|-------------------|--------|---|---|
| KR | 10-2017-0006013 A | 1/2017 | | |
| KR | 20170006013 | \* | 1/2017 | ........... G02F 1/1333 |
| KR | 10-1765121 B1 | 8/2017 | | |
| KR | 10-2017-0140465 A | 12/2017 | | |

\* cited by examiner

FLEXIBLE DISPLAY APPARATUS

CROSS REFERENCE TO RELATED APPLICATIONS

This application is the National Phase of PCT/KR2019/007329 filed on Jun. 18, 2019, which is hereby expressly incorporated by reference into the present application.

TECHNICAL FIELD

The present disclosure relates to a flexible display apparatus having a flexible display deformable by external force.

BACKGROUND ART

Terminals may be divided into mobile/portable terminals and stationary terminals according to mobility. Also, the mobile terminals may be classified into handheld types and vehicle mount types according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player. Efforts are ongoing to support and increase the functionality of mobile terminals. Such efforts include software and hardware improvements, as well as changes and improvements in the structural components.

Such mobile terminals are evolving into various types of designs and efforts are being made to develop more novel types of mobile terminals in order to meet the needs of users who desire newer and more various designs. The novel types include structural changes and improvements for the users to use the mobile terminals more conveniently. As one of such structural changes and improvements, mobile terminals in which at least part of a display unit can be bent or curved are attracting attention. In particular, as a flexible display capable of being bent has been developed, various studies have been made to apply the flexible display to a mobile terminal.

In the related art, a structure of a mobile terminal using a flexible display is disclosed. However, in order to implement a mobile terminal having a display capable of being bent, rolled, or curved, a structure of the mobile terminal must be changed. As a result, the structure of the mobile terminal becomes complicated to smoothly support the display in case where the display is unfolded or opened and a case where the display is changed in shape due to being bent or curved.

When a load is applied to a flexible display, the display is sagged or distorted due to pressure by touch.

Accordingly, in order to smoothly implement a screen using a flexible display, studies are required on devices that can allow the flexible display to be smoothly unrolled or rolled, especially, can support a rear surface of the display to prevent the screen from being distorted due to touch pressure applied to the display in an unrolled (opened) state of the flexible display and can smoothly support the display in response to a changed shape of the display when the flexible display is bent to be rolled.

DISCLOSURE OF INVENTION

Technical Problem

The present disclosure describes a structure of a flexible display apparatus in which a flexible display can be rolled or unrolled on a body part so as to achieve improved user convenience and portability.

The present disclosure also describes a structure of a flexible display apparatus in which a flexible display can be effectively rolled or unrolled by a user.

The present disclosure further describes a structure capable of securing reliability by reducing external force to be applied to a flexible display even when the flexible display is changed in shape due to being rolled.

Solution to Problem

In order to achieve the above aspects of the present disclosure, there is provided a flexible display apparatus that may include a body part having a shape of a polygonal pillar (or prism), a flexible display deformable by external force, and a frame part including a plurality of segment plates arranged in parallel to one another and configured to be rolled on or unrolled from an outer surface of the body part while supporting the flexible display. Each of the segment plates may surround the body part to correspond to a rolling radius as the frame part is rolled, and segment plates neighboring each other may be in close contact with each other as the frame part is unrolled. Accordingly, since the segment plates are arranged in parallel to one another to be in close contact without a gap, any deformation can be prevented even when a user applies a touch input.

According to one implementation, the segment plates may be in close contact with the outer surface of the body part to define a rolled state of the flexible display and spaced apart from the outer surface of the body part to define an unrolled state of the flexible display.

According to one implementation, the flexible display may be configured such that a region exposed to outside is expanded while being unrolled from the body part and the region exposed to the outside is reduced while being rolled on the body part.

According to one implementation, the frame part may include rolling parts each having a plurality of segment plates that have a predetermined height and are provided as many as a number of edges of the body part.

According to one implementation, the body part may have a shape of a hexagonal pillar and the segment plates may be rolled on the body part in close contact with the outer surface of the body part.

According to one implementation, the segment plates may be in close contact with the outer surface of the body part as the frame part is rolled on the outer surface of the body part, and a width of each segment plate in a left and right direction may increase in a radial direction in a state where the segment plates are rolled on the body part. In addition, the segment plates may be provided to correspond to a number of outer surfaces of the body part.

According to one implementation, the flexible display apparatus may further include a rear plate coupled to a rear surface of the flexible display to be deformed together with the flexible display.

According to one implementation, a front surface of the rear plate may be closely adhered on the rear surface of the flexible display, and one side of the rear surface of the rear plate may be coupled to the segment plates.

According to one implementation, an adhesive region and a non-adhesive region may be alternately formed on a rear surface of the rear plate.

According to one implementation, each of the segment plates may include an adhesive portion coupled to the rear surface of the rear plate and a non-adhesive portion disposed to be spaced apart from the rear surface of the rear plate.

According to one implementation, the non-adhesive portions may be disposed to be adjacent to each other between segment plates neighboring each other.

According to one implementation, a distance between segment plates neighboring each other may change depending on rolled and unrolled states of the flexible display.

According to one implementation, an inclined surface having a predetermined inclination may be formed on an outer surface of each of the segment plates, and segment plates neighboring each other may be arranged to be in contact with each other by the inclined surface.

According to one implementation, a protrusion may protrude outward from one side of each of the segment plates and a receiving portion may be recessed into another side of the segment plate. The protrusion may be inserted into the receiving portion between segment plates neighboring each other.

According to one implementation, a first magnet may be disposed at an end portion of the protrusion.

A second magnet may be disposed at one side of the receiving portion. The protrusion may be located in the receiving portion and the first magnet and the second magnet may be located adjacent to each other to interact with each other in an unrolled state of the frame part, such that the frame part is fixed.

According to one implementation, a storage space may be defined inside the body part and electronic components may be installed in the storage space.

Advantageous Effects of Invention

Effects of the present disclosure that can be obtained through the solution will be described as follows.

In a flexible display apparatus having the aforementioned structure, a flexible display can be rolled on or unrolled from a body part, thereby more improving user convenience and portability.

The flexible display can be effectively rolled on or unrolled from an outer surface of the body part by segment plates constituting a frame part.

Since the flexible display is rolled together with a rear plate coupled to a rear surface thereof, external force to be applied to the flexible display can be minimized even if the flexible display is deformed.

An inclined surface or a protrusion and a receiving portion can be disposed between segment plates neighboring each other, so as to restrict sagging of the segment plates or secure sufficient support force, thereby maintaining a structure of the frame part.

Magnets can be disposed in segment plates neighboring each other, so as to secure support force for fixing the shape of the flexible display when the flexible display is unrolled.

MODE FOR THE INVENTION

Figure 1:
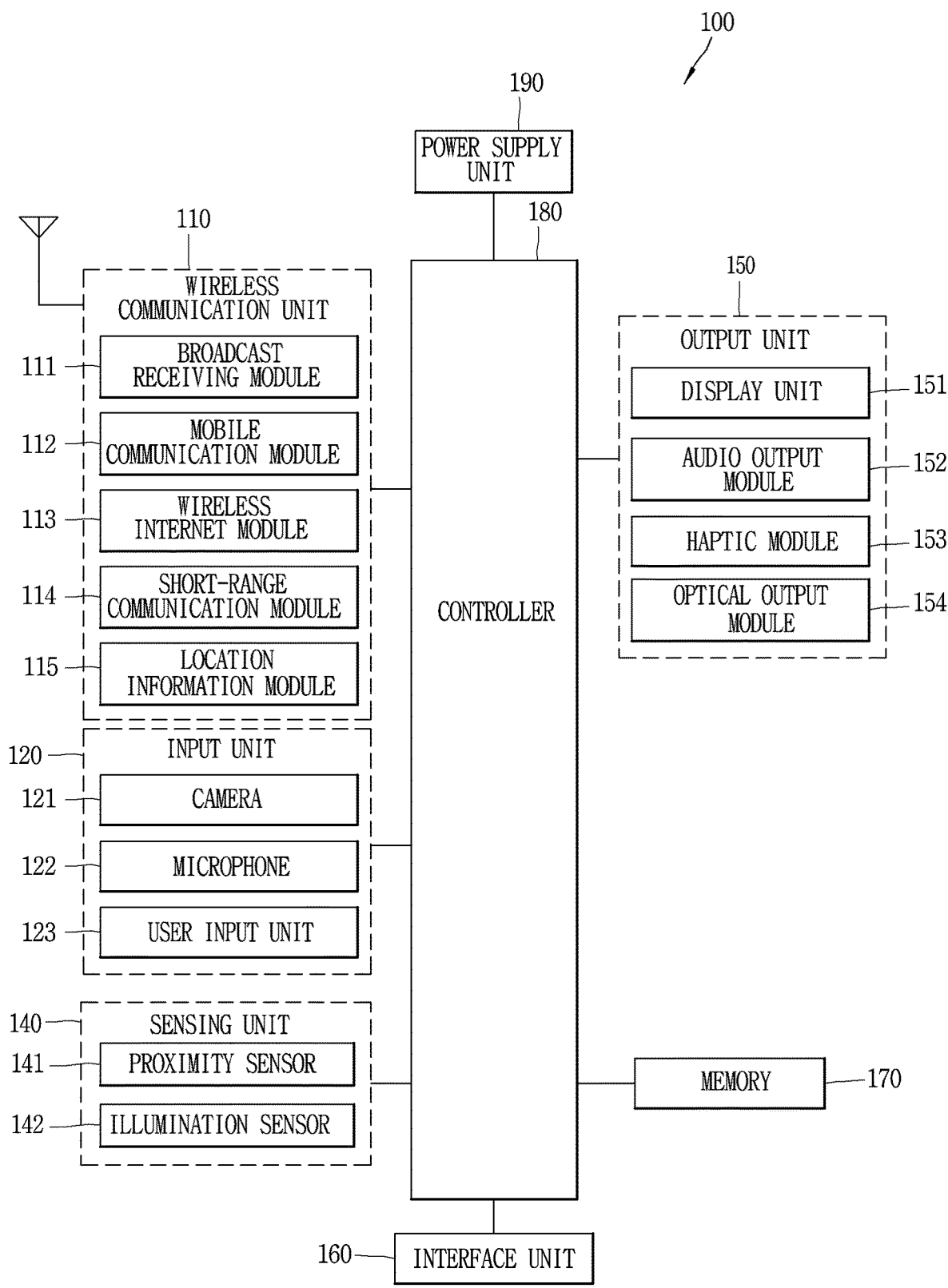
FIG. 1 is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Display devices presented herein may be implemented using a variety of different types of terminals. Examples of such devices include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers, digital signages, and the like, excluding a case of being applicable only to the mobile terminals. Hereinafter, for convenience of description, in this specification, a mobile terminal will be described as an example of a flexible display apparatus.

FIG. 1 is a block diagram illustrating a mobile terminal in accordance with the present disclosure.

The mobile terminal 100 may be shown having components such as a wireless communication unit 110, an input unit 120, a sensing unit 140, an output unit 150, an interface unit 160, a memory 170, a controller (or control unit) 180, and a power supply unit 190. It is understood that implementing all of the illustrated components is not a requirement. Greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for obtaining images or video, a microphone 122, which is one type of audio (voice) input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display 151, an audio output module 152, a haptic module 153, and an optical output module 154. The display 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions related to a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the control unit 180 to perform an operation (or function) for the mobile terminal 100.

The control unit 180 typically functions to control an overall operation of the mobile terminal 100, in addition to the operations associated with the application programs. The control unit 180 may provide or process information or functions appropriate for a user by processing signals, data, information and the like, which are input or output by the aforementioned various components, or activating application programs stored in the memory 170.

Also, the controller 180 may control at least some of the components illustrated in FIG. 1A, to execute an application program that have been stored in the memory 170. In addition, the control unit 180 may control at least two of those components included in the mobile terminal 100 to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1, prior to describing various embodiments implemented through the mobile terminal 100.

First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. Two or more broadcast receiving modules may be utilized in the mobile terminal 100 to facilitate simultaneous reception of two or more broadcast channels, or to support switching among broadcast channels.

The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal in a form that a TV or radio broadcast signal is combined with a data broadcast signal.

The broadcast signal may be encrypted by at least one of technical standards (or broadcasting methods, e.g., ISO, IEC, DVB, ATSC, etc.) for transmitting and receiving a digital broadcast signal. The broadcast receiving module 111 may receive the digital broadcast signal using a method suitable for a technical standard selected from those technical standards.

Examples of the broadcast associated information may include information associated with a broadcast channel, a broadcast program, a broadcast service provider, and the like. The broadcast associated information may be provided via a mobile communication network. In this case, the broadcast associated information may be received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like. The broadcast signal and/or the broadcast related information received through the broadcast receiving module 111 may be stored in the memory 160.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink PacketAccess), Long Term Evolution (LTE), LTE-A (Long Term Evolution-Advanced), and the like).

The wireless signal may include various types of data depending on a voice call signal, a video call signal, or a text/multimedia message transmission/reception.

The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area network.

Here, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

The input unit 120 is for inputting image or video information (or signal), audio information (or signal), data, or user input. The mobile terminal 100 may include one or a plurality of cameras 121 through which such image information can be obtained. Such cameras 121 may process image frames of still pictures or video obtained by image sensors in a video or image capture mode. The processed image frames can be displayed on the display 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the control unit 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The control unit 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner area of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared ray proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display 151, or convert capacitance occurring at a specific part of the display 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which area of the display 151 has been touched. Here, the touch controller may be a component separate from the control unit 180, the control unit 180, and combinations thereof.

Meanwhile, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display 151 may be implemented as a stereoscopic display for displaying stereoscopic images.

A typical stereoscopic display may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 may be controlled by user selection or setting by the controller 180. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control operations relating to application programs and the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provides internal power and supply the appropriate power required for operating respective elements and components included in the HMD 100 under the control of the control unit 180. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display.

The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a control unit 180 may generate a control command corresponding to the touch. Contents input in the touch manner may be characters, numbers, instructions in various modes, or a menu item that can be specified.

The microphone 122 may be configured to receive the user's voice, other sounds, and the like. The microphone 122 may be provided at a plurality of places, and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of a housing or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Figure 2:
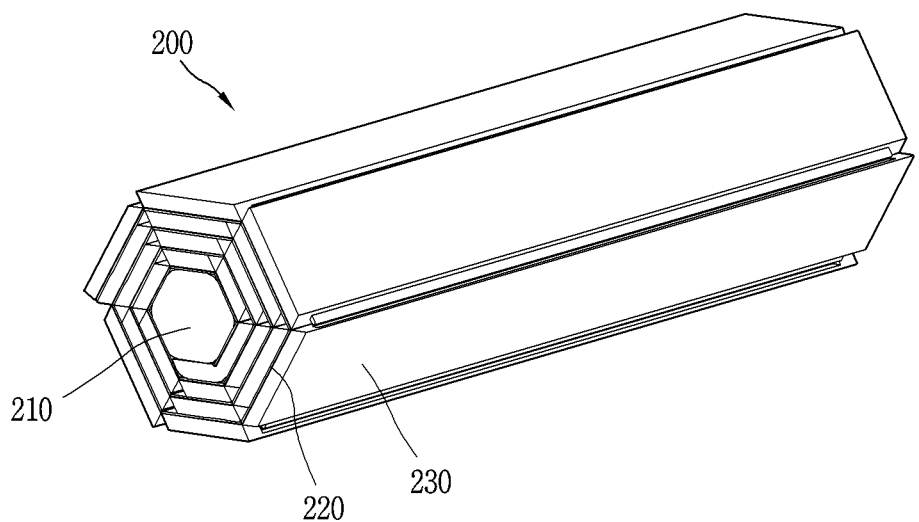
FIG. 2 is a perspective view illustrating a state in which a flexible display apparatus is rolled on a body part.
Figure 3:
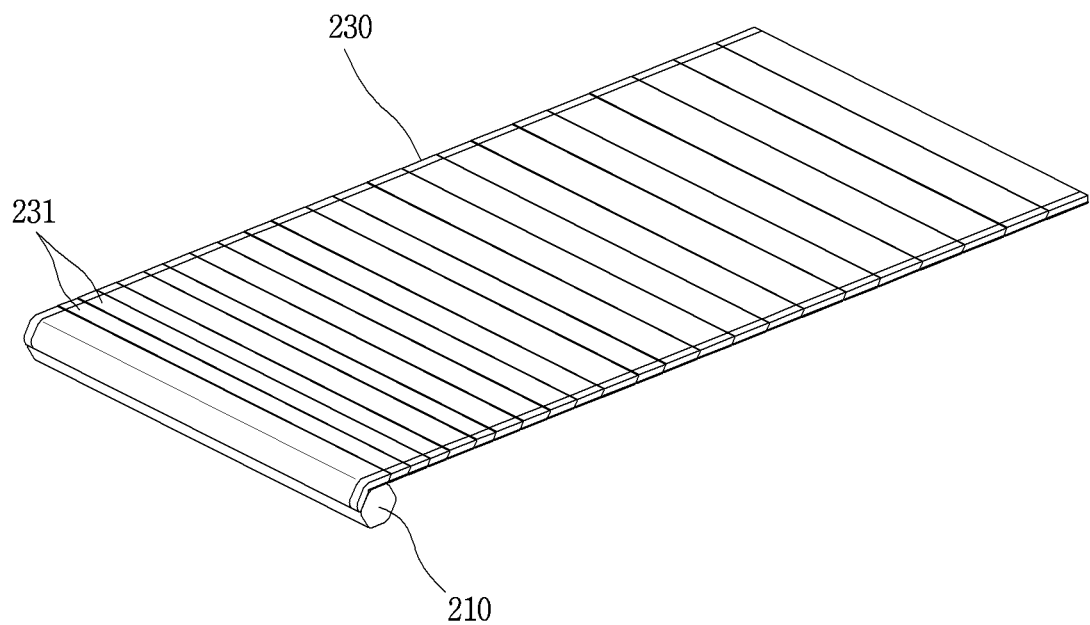
FIG. 3 is a perspective view illustrating a state in which a frame part of the flexible display apparatus is unrolled from the body part.

FIG. 2 is a perspective view illustrating a state in which a flexible display apparatus 200 is rolled on a body part 210. FIG. 3 is a perspective view illustrating a state in which a frame part 230 of the flexible display apparatus 200 is unrolled from the body part 210.

The flexible display apparatus 200 may be understood as one type of the aforementioned mobile terminal.

The flexible display apparatus 200 according to the present disclosure may include a body part 210 and a frame part 230 supporting a flexible display 220. The flexible display apparatus 200 may further include the flexible display 220 that is deformable by external force.

As illustrated in FIG. 2, the flexible display apparatus 200 according to the present disclosure may implement a first state in which the flexible display 220 is rolled around a body part 210, and a second state in which the flexible display 220 is unrolled from the body part 210.

The body part 210 may be implemented as a pillar (or prism) having a polygonal shape. The body part 210 may have a polygonal cut surface, extend in one direction, and define an inner storage space (not illustrated) in which various electronic components can be installed. In addition, covers may be disposed on both sides of the body part 210 to restrict exposure of the storage space of the body part 210. In this case, the covers may be detachable such that the electronic components (not illustrated) mounted in the body part 210 can be drawn out or replaced.

Various electronic components (not illustrated) may be mounted in the storage space (not illustrated) defined inside the body part 210. For example, a circuit board, an identification module, a memory card, and the like which are all detachable may be installed in the body part 210.

At least one antenna for wireless communication may be disposed inside the body part 210, and the power supply unit 190 (refer to FIG. 1) for supplying power to the flexible display apparatus 200 may also be disposed in the body part 210.

Here, the power supply unit 190 may include a battery 191 which is mounted to be detachable from the body part 210. The battery 191 may be configured to receive power through a power cable connected to the interface unit 160 and to be wirelessly charged through a wireless charging device. The wireless charging may be implemented by magnetic induction or electromagnetic resonance.

In addition, a flexible printed circuit board (not illustrated) may be disposed in a state of being connected to one end portion of the flexible display 220. The flexible printed circuit board (not illustrated) may include thereon a driver semiconductor (Driver IC, not illustrated) for driving the flexible display 220. The driver IC may be configured to apply a driving signal and data to a display panel as electrical signals (multi-high voltage level signal), such that text or image can be displayed on a screen of the flexible display 220.

The body part 210 may be formed of a metal material. The frame part 230 may be formed of synthetic resin by injection-molding or may be formed of a metal, for example, stainless steel (STS), aluminum (Al), titanium (Ti), or the like.

The flexible display 220 may serve to output information processed in the flexible display apparatus 200. For example, the flexible display 220 may display execution screen information related to an application program executed at the flexible display apparatus 200 or user interface (UI) information and graphic user interface (GUI) information in response to the execution screen information.

The flexible display 220 may include at least one of a liquid crystal display (LCD), a thin film transistor-LCD (TFT LCD), an organic light-emitting diode (OLED), a flexible display, a three-dimensional (3D) display and an e-ink display.

The flexible display 220 may include a touch sensor that senses a touch with respect to the flexible display 220 so as to receive a control command in a touching manner. When a touch is input to the flexible display 220, the touch sensor may sense this touch and the controller may generate a control command corresponding to the touch. Contents input in the touching manner may be characters, numbers, instructions in various modes, or menu items that can be designated.

Figure 4:
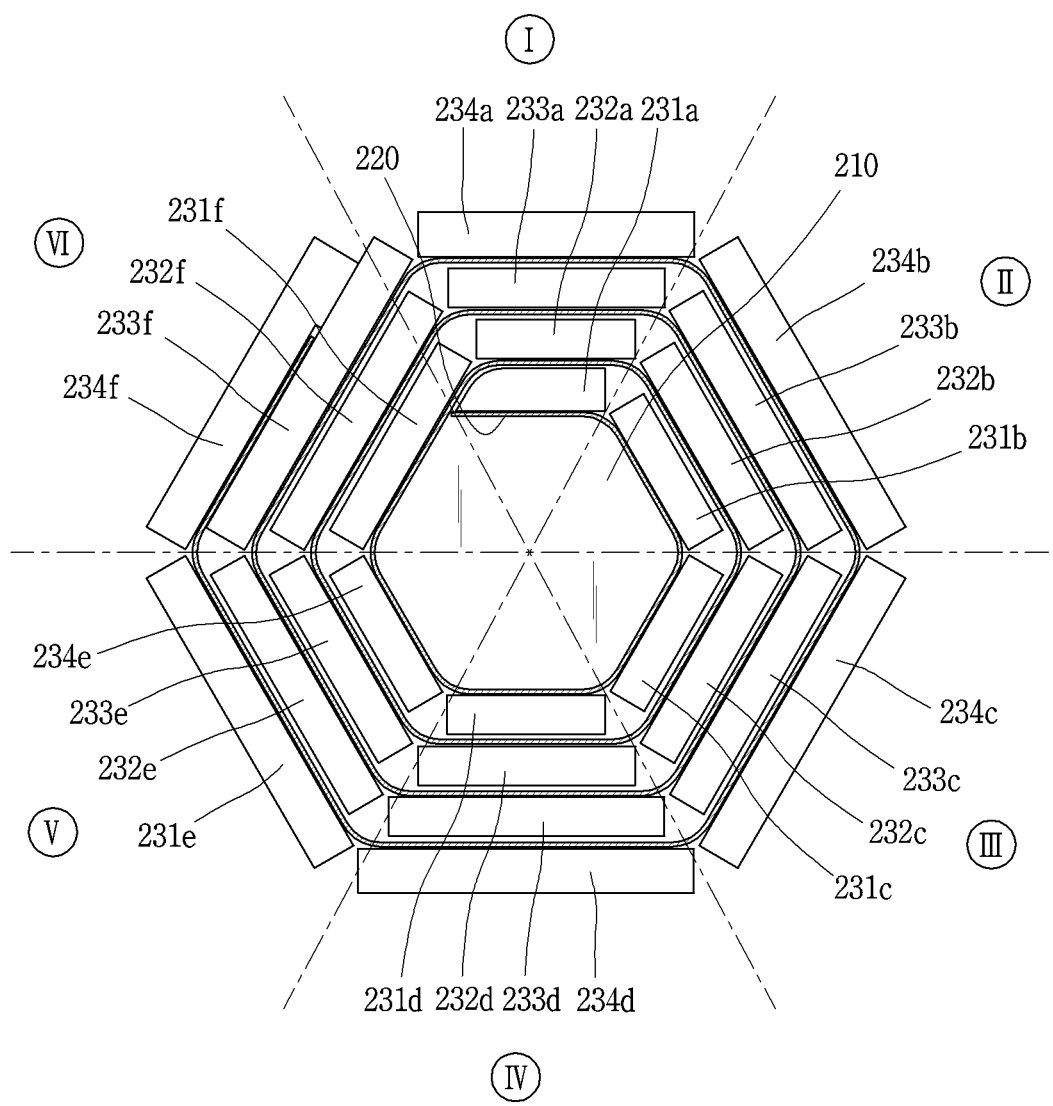
FIG. 4 is a lateral view illustrating a state when the flexible display is rolled on the body part.

As illustrated in FIGS. 3 and 4, the flexible display apparatus 200 according to the present disclosure may display processed information using a display having a flexible characteristic.

The flexible display apparatus 200 may display processed information using the flexible display 220 having a flexible characteristic that is deformable by external force.

Here, the deformation may mean at least one of curving, bending, folding, twisting, and rolling of a display module, and may refer to in the present disclosure a characteristic that the flexible display 220 is rolled along an outer surface of the body part 210.

Here, the flexible display 220 may include a typical flexible display, an electronic paper (e-paper), and a combination thereof.

The typical flexible display may refer to a durable display that is lightweight and does not break easily by being fabricated on a thin, flexible substrate, such as paper, which is bent, curved, folded, twisted or rolled while maintaining characteristics of an existing flat panel display.

In addition, the electronic paper may be a display to which general ink characteristics are applied, and may be different from the existing flat panel display in view of using reflected light. The electronic paper may change information by using twist balls or electrophoresis using capsules.

The flexible display apparatus 200 according to the present disclosure may implement a state in which the flexible display 220 is deformed by external force (e.g., a state where it has a finite radius of curvature and is rolled around the body part 210, namely, a first state, see FIG. 2), and a state in which the flexible display 220 is unrolled (e.g., a state where it has an infinite radius of curvature, namely, a second state, see FIG. 3).

The user can utilize the flexible display apparatus 200 in the second state in which the flexible display 220 is unrolled, and can keep (store) the flexible display apparatus 200 in the state where the flexible display 220 is rolled on the body part 210. This can provide potability as well as convenience in use, and facilitate the storage.

Also, information displayed on the flexible display 220 may include output visual information. Such visual information can be realized by independently controlling an emission of unit pixels (sub-pixels) arranged in a matrix configuration. The unit pixel denotes an elementary unit for representing one color.

Meanwhile, the flexible display 220 may be combined with a touch sensor to implement a flexible touch screen. When a touch is applied to the flexible touch screen, the controller 180 (see FIG. 1) may perform a control corresponding to the touch input. The flexible touch screen may be configured to sense a touch input even in the second state as well as the first state.

Meanwhile, the flexible display apparatus 200 according to an exemplary modification may include a deformation detecting unit that detects deformation of the flexible display 220. The deformation detecting unit may be included in the sensing unit 140 (see FIG. 1).

The deformation detecting unit may be disposed in the flexible display 220 or the body part 210 to detect information related to deformation of the flexible display 220.

Here, the information related to the deformation may be a deformed to direction of the flexible display 220, a deformed degree, a deformed position, a deformed time, and an acceleration at which the deformed flexible display 220 is restored. The deformation-related information may be various information which can be detected due to the flexible display 220 being curved or bent.

In addition, the controller 180 (see FIG. 1) may change information displayed on the flexible display 220 or generate a control signal for controlling a function of the flexible display apparatus 200 based on the information related to the deformation of the flexible display 220 detected by the deformation detecting unit.

The state deformation of the flexible display 220 may not always be caused by external force. For example, the flexible display 220 may be deformed from the first state to the second state or from the second state to the first state according to a command input by a user or an application.

As illustrated in FIG. 3, when external force is applied to the flexible display 220 in the unrolled state of the flexible display 220, the flexible display 220 may be deformed as illustrated in FIG. 2 such that the frame part 230 is rolled on the body part 210.

Accordingly, the user can use the flexible display apparatus 200 when the flexible display 220 is in the unrolled state as illustrated in FIG. 3, and keep or carry the flexible display apparatus 200 in the state where the flexible display 220 is rolled on the body part 210. This can facilitate carrying and keeping of the flexible display apparatus 200.

The frame part 230 may be configured by a plurality of segment plates arranged in parallel to one another. As illustrated in FIG. 4, the segment plates may be disposed such that a width of each segment plate in a left and right direction increases in a radial direction in a state in which the segment plates are rolled on the body part 210.

The plurality of segment plates may be rolled or unrolled along an outer surface of the body part 210 while supporting the flexible display 220. At this time, when the frame part 230 is rolled around the body part 210, each segment plate may be located to be in close contact with the outer surface of the body part 210. A detailed description thereof will be given later.

Figure 5A:
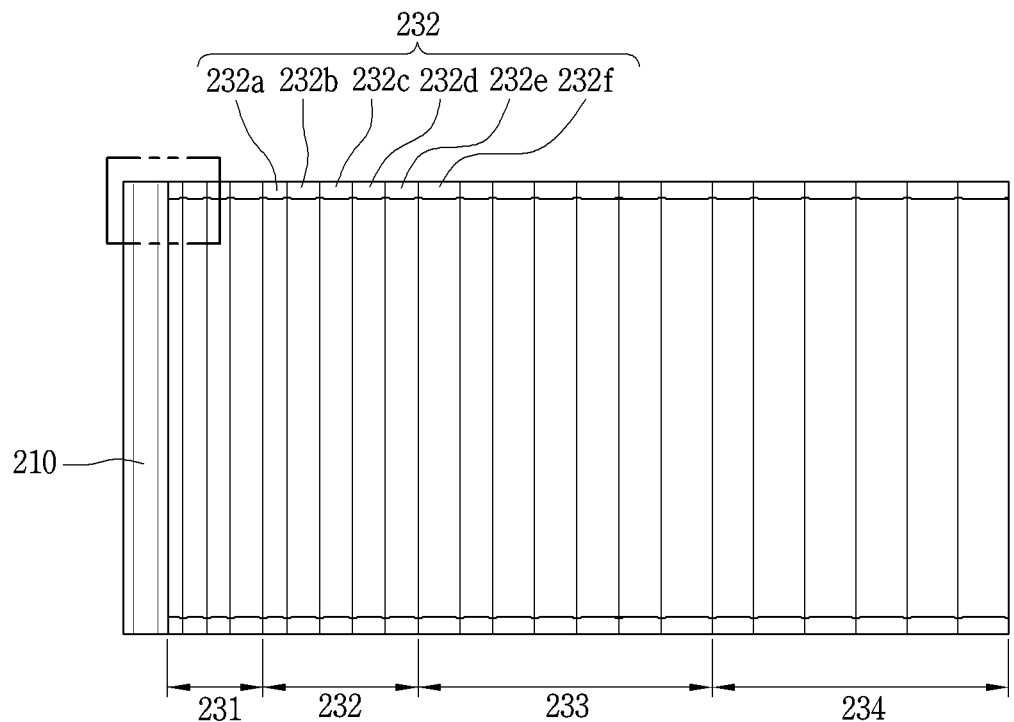
FIG. 5A is a conceptual view illustrating a state in which the frame part is unrolled.
Figure 5B:
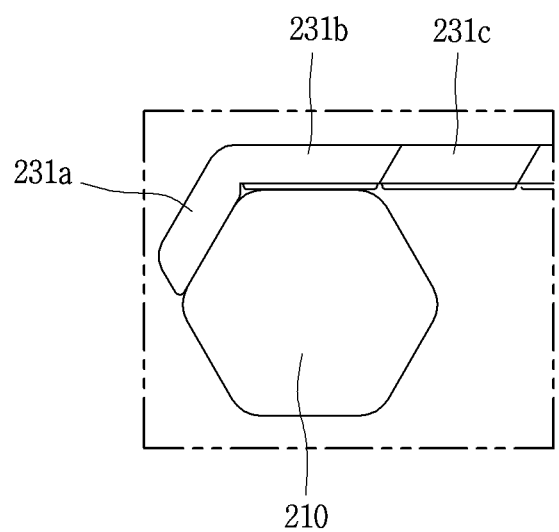
FIG. 5B is an enlarged view illustrating a state in which the frame part is coupled to one side of the body part.

FIG. 4 is a lateral view illustrating a state where the flexible display is rolled on the body part 210. FIG. 5A is a conceptual view illustrating a state in which the frame part 230 is unrolled and FIG. 5B is an enlarged view illustrating a state in which the frame part 230 is coupled to one side of the body part 210.

The flexible display 220 may be rolled on the body part 210 together with the frame part 230 while being deformed from an unrolled state (or less curved state) to a rolled state (or a more curved state).

The frame part 230 may include a plurality of segment plates arranged in parallel to one another. Here, the segment plates may be rectangular plates having a constant thickness, as illustrated in FIG. 4. The segment plates may be disposed on a rear surface (or a rear portion) of the flexible display 220 so as to support the deformation of the flexible display 220.

As the frame part 230 is unrolled from the body part 210, segment plates adjacent to each other may be located to be in close contact with each other. At this time, the segmental plates may be disposed side by side and may be in close contact with each other without a gap therebetween. Accordingly, when a portion between the adjacent segment plates is pressed by a user touch input applied to a front surface (or front portion) of the flexible display 220, the flexible display 220 can be supported by each segment plate, thereby restricting an occurrence of deformation or screen distortion.

In addition, each segment plate may be brought into close contact with the outer surface of the body part 210 by external force. At this time, the flexible display 220 can be rolled on the body part 210.

As illustrated in FIG. 4, when the frame part 230 is rolled on the body part 210, the segment plates can surround the body part 210 to correspond to a rolling radius.

Specifically, the segment plates may be rolled on the outer surface of the body part 210 according to the rolling radius, and in this case, a predetermined gap may be defined between the adjacent segment plates.

At this time, the frame part 230 may be rolled on the body part 210 selectively in a clockwise direction or a counterclockwise direction. In this specification, an example in which the frame part 230 is rolled on the body part 210 will be described.

Each segment plate may have a constant length in a horizontal direction, a constant length in a vertical direction, and a constant thickness (H). Here, the horizontal direction refers to a direction in which the frame part is unrolled, as illustrated in FIG. 3, and the vertical direction refers to an extending direction of the body part 210. Also, a thickness direction refers to a direction in which the segment plate is opposite to the flexible display 220.

The segment plate may be formed in a shape of a rectangular plate. Since each segment plate must be rolled along the outer surface of the body part 210, a horizontal width of the segment plate may correspond to a length of each edge of the outer surface of the body part 210.

As illustrated in FIG. 4, the segment plates constituting the frame part 230 may form rolling parts that are provided as many as the number of edges defining (the outer surface of) the body part 210.

Specifically, the frame part 230 may include rolling parts 231, 232, 233, 234 each made up of a plurality of segment plates that have a predetermined thickness and are provided as many as the number of edges of the body part 210.

The rolling part 231, 232, 233, 234 refers to an assembly of segment plates wound in a roll shape along the outer surface of the body part 210, and may be provided in plurality disposed outward from the outer surface of the body part 210.

In this case, the number of rolling parts may be selected depending on a selected size of the flexible display 220.

As described above, the body part 210 may be the pillar having the polygonal shape. The body part 210 may be formed in a shape of, for example, a pentagonal pillar (or prism), a hexagonal pillar, a heptagonal pillar, or an octagonal pillar. In the present disclosure, an example in which the body part 210 is formed in the shape of a hexagonal pillar will be described.

As illustrated in FIG. 4, the body part 210 may be formed in a shape of a hexagonal pillar that has the same number of edges as the number of segment plates constituting each rolling part 231, 232, 233, 234.

When the outer surface (outer portion, outer side) of the body part 210 is defined by six outer surfaces, each rolling part 231, 232, 233, 234 may be constituted by six segment plates.

That is, when the body part 210 has the shape of the hexagonal pillar, each of the rolling parts 231, 232, 233, 234 may include the same number of segment plates as the number of outer surfaces of the body part 210. Through the rolling parts 231, 232, 233, 234, the segment plates can be brought into close contact respectively with the six outer surfaces defining the outer portion of the body part 210. Therefore, the frame part 230 can be effectively rolled on the body part 210.

Hereinafter, a structure in which the frame part 230 is rolled on the body part 210 will be described with reference to FIG. 4. The segment plates constituting the frame part 230 can be rolled along the outer surface of the body part 210 having the hexagonal pillar shape. In this case, the flexible display 220 may be rolled, as illustrated in FIG. 4, in the shape in which a first rolling part 231, a second rolling part 232, a third rolling part 233, and a fourth rolling part 234 are sequentially rolled on the body part 210.

The first rolling part 231 may include a first segment plate 231a, a second segment plate 231b, a third segment plate 231c, a fourth segment plate 231d, a fifth segment plate 231e, and a sixth segment plate 231f that are disposed parallel to one another.

The second rolling part 232 may include a first segment plate 232a, a second segment plate 232b, a third segment plate 232c, a fourth segment plate 232d, a fifth segment plate 232e, and a sixth segment plate 232f that are disposed parallel to one another.

The third rolling part 233 may include a first segment plate 233a, a second segment plate 233b, a third segment plate 233c, a fourth segment plate 233d, a fifth segment plate 233e, and a sixth segment plate 233f that are disposed parallel to one another.

The fourth rolling part 234 may include a first segment plate 234a, a second segment plate 234b, a third segment plate 234c, a fourth segment plate 234d, a fifth segment plate 234e, and a sixth segment plate 234f that are disposed parallel to one another.

Since these rolling parts 231, 232, 233, and 234 are sequentially rolled along the outer surface of the body part 210, as illustrated in FIG. 4, the segment plates may be disposed in an overlapping manner at first to sixth regions that are divided based on a center of a regular hexagon.

In detail, the first segment plates 231a, 232a, 233a, and 234a may be located at the first region I, the second segment plates 231b, 232b, 233b, and 234b may be located at the second region II, the third segment plates 231c, 232c, 233c, and 234c may be located at the third region III, the fourth segment plates 231d, 232d, 233d, and 234d may be located at the fourth region IV, the fifth segment plates 231e, 232e, 233e, and 234e may be located at the fifth region V, and the sixth segment plates 231f, 232f, 233f, and 234f may be located at the sixth region VI.

In addition, as illustrated in FIG. 4, a width of each segment plate in the left and right direction may increase in the radial direction in a state in which the segment plates are rolled on the body part 210.

At this time, when the frame part 230 is sequentially rolled along the body part 210, the flexible display 220 may be bent at a constant curvature. Especially, a region between adjacent segment plates can be bent at a constant curvature, thereby securing reliability with respect to deformation of the flexible display 220.

As illustrated in FIG. 5A, the rolling parts 231, 232, 233, and 234 may be located in the order of the first rolling part 231, the second rolling part 232, and the third rolling part 233, and the fourth rolling part 244 in a direction away from the body part 210. Each of the rolling parts 231, 232, 233, and 234 may include six segment plates to correspond to the number of outer surfaces of the body part 210.

For example, as illustrated in FIG. 5A, the second rolling part 232 may include the first segment plate 232a, the second segment plate 232b, the third segment plate 232c, the fourth segment plate 232d, the fifth segment plate 232e, and the sixth segment plate 232f that are disposed parallel to one another. Since the shape of each segment plate is the same as described above, the description thereof will be omitted.

Likewise, the first rolling part 231, the third rolling part 233, and the fourth rolling part 234 may also include a plurality of segment plates in the same way.

In addition, as illustrated in FIG. 5B, the first segment plate 231a of the first rolling part 231 may be fixed to the outer surface of the body part 210. In this manner, the rolling parts 231, 232, 233, and 234 may be rolled as illustrated in FIG. 4 in the first state where the flexible display 220 is rolled. At this time, the segment plates constituting each of the rolling parts 231, 232, 233, and 234 can be sequentially rolled along the outer surface of the body part 210, so as to surround the part 210.

Figure 6:
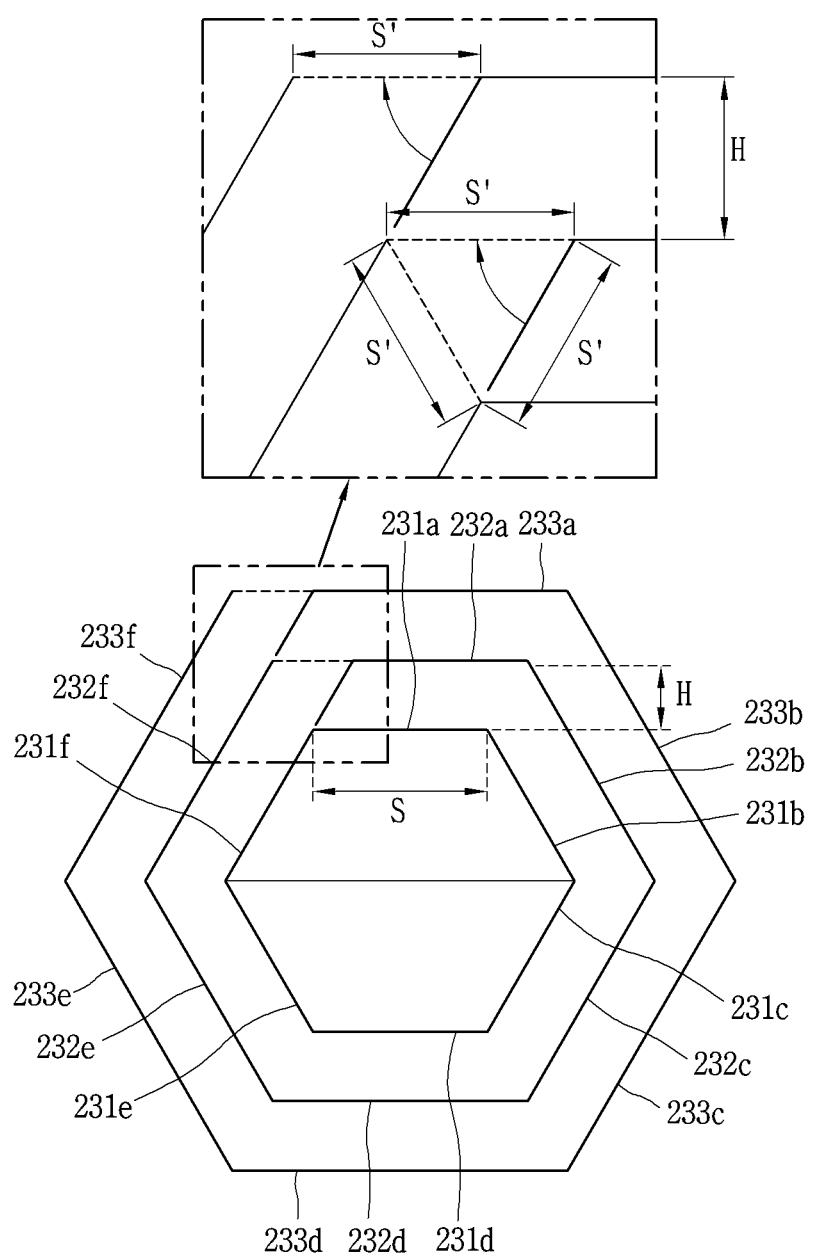
FIG. 6 is a conceptual view illustrating a state when a flexible display is rolled on the body part together with the frame part.
Figure 7:
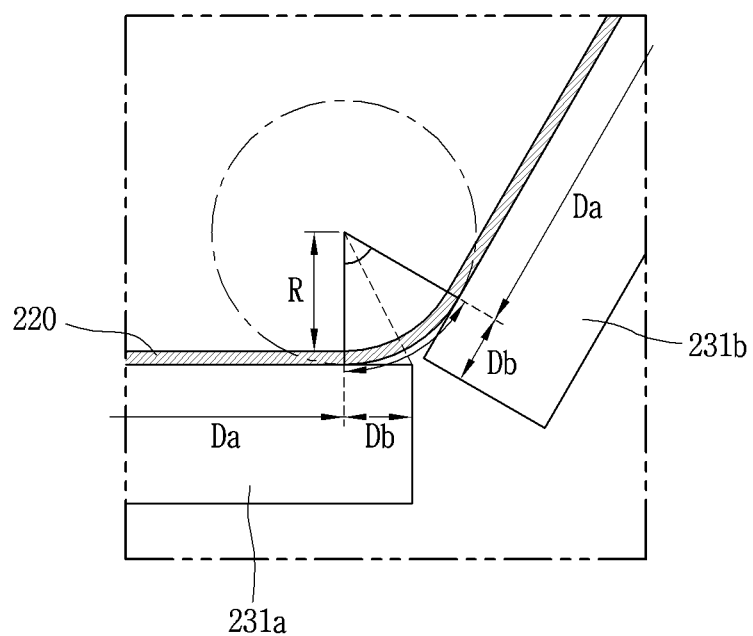
FIG. 7 is a conceptual view illustrating a state when the flexible display is bent.

FIG. 6 is a conceptual view illustrating a state when the flexible display 220 is rolled on the body part 210 together with the frame part 230 and FIG. 7 is a conceptual view illustrating a state when the flexible display 220 is bent.

As illustrated in FIG. 6, the segment plates constituting the frame part 230 may be rolled along the outer surface of the body part 210 in a connected state to one another when the flexible display 220 is rolled on the body part 210.

When the frame part 230 is rolled on the body part 210, each segment plate may surround the body part 210 to correspond to a rolling radius. Specifically, the segment plates may be rolled on the outer surface of the body part 210 according to the rolling radius, and in this case, a predetermined gap may be defined between the adjacent segment plates.

The frame part 230 may include the plurality of rolling parts 231, 232, 233, and 234 to be rollable on the body part 210, and each rolling part may include the segment plates as many as the number of outer surfaces of the body part 210.

Explaining the structure in which the frame part 230 is rolled on the body part 210, the segment plates constituting the frame part 230 may be rolled along the outer surface of the body part 210 having the hexagonal pillar shape, so as to define the first state of the flexible display apparatus 200. In this case, as illustrated in FIG. 6, the flexible display 220 may have a rolled shape in which the first rolling part 231a, 231b, 231c, 231d, 231e, and 231f, the second rolling part 232a, 232b, 232c, 232d, 232e, and 232f, and the third rolling part 233a, 233b, 233c, 233d, 233e, and 233f are rolled.

Specifically, as illustrated in FIG. 6, the flexible display 220 may be deformed along a line of a hexagon positioned at the innermost side, then deformed along a line extending from an upper left vertex of the line of the hexagon, and continuously deformed along a line of a second hexagon.

Also, the flexible display 220 may be deformed along a line extending from an upper left vertex of the second hexagon and then deformed along a line of a third hexagon.

At this time, as illustrated in an enlarged part of FIG. 6, a length S' of the line extending from the upper left vertex of the first hexagon toward an edge of the second hexagon and lengths formed by two dotted lines may be the same because those lines define an equilateral triangle.

Explaining this in detail, if it is assumed that a length of one edge of the first hexagon is S and a distance between the first and second hexagons is H, a length of one edge of the second hexagon can be $S+(2*\tan(30)*H)=S+(2/\sqrt{3}*H)$. In the same way, a length of one edge of the third hexagon can be $S+2*(2/\sqrt{3}*H)$.

As such, when the body part 210 has a regular hexagonal cross-section, a length of one edge of the flexible display 220 rolled on the body part 210 can be derived from an equation of $S+(N-1)(2/\sqrt{3}*H)$. Here, S denotes the length of the one edge of the first hexagon, and H denotes the distance between the first hexagon and the second hexagon. Accordingly, an edge of an Nth regular hexagon can be derived and thus lengths of edges of the flexible display 220 can be obtained.

Expanding this, when the body part 210 has a regular polygonal cross-section, a length of one edge of an Nth regular polygon can be $S+(N-1)(\tan(90-A/2)*H)$. Here, S denotes a length of one edge of a first regular polygon and H denotes a distance between the first regular polygon and a second regular polygon. A denotes an angle formed by a line extending from one vertex of the first regular polygon to one vertex of the second regular polygon and an edge of the first regular polygon.

Also, as illustrated in FIG. 7, when the frame part 230 is rolled along the body part 210, the flexible display 220 may be bent while forming a constant curvature.

At this time, a rear plate 240 may be attached to a rear surface of the flexible display 220. The flexible display 220 may be rolled together with the rear plate 240 along the outer surface of the body part 210 or unrolled from the body part 210.

Each segment plate may include an adhesive portion Da to be coupled to a rear surface of the rear plate 240 and a non-adhesive portion Db disposed to be spaced apart from the rear surface of the rear plate 240.

In addition, an adhesive region 240a formed to correspond to the adhesive portion Da of each segment plate and a non-adhesive region 240b formed to correspond to the non-adhesive portion Db may be alternately disposed on the rear surface of the rear plate 240.

At this time, the non-adhesive portions Db may be located adjacent to each other between neighboring segment plates. Accordingly, when the flexible display 220 is bent, one region of the flexible display 220 can be more smoothly bent with a constant curvature while a distance between the neighboring segment plates changes.

For example, as illustrated in FIG. 7, the adhesive portion Da and the non-adhesive portion Db may be respectively formed on the first segment plate 231a and the second segment plate 231b neighboring each other.

At this time, the distance between the neighboring segment plates may change depending on the rolled state of the flexible display 220, such that the flexible display 220 can be bent with a constant radius of curvature R at a region between the first segment plate 231a and the second segment plate 231b. That is, since the adhesive portion Da and the non-adhesive portion Db are formed on each segment plate, reliability with respect to the deformation of the flexible display part 220 due to rolling and unrolling can be secured.

Figure 8:
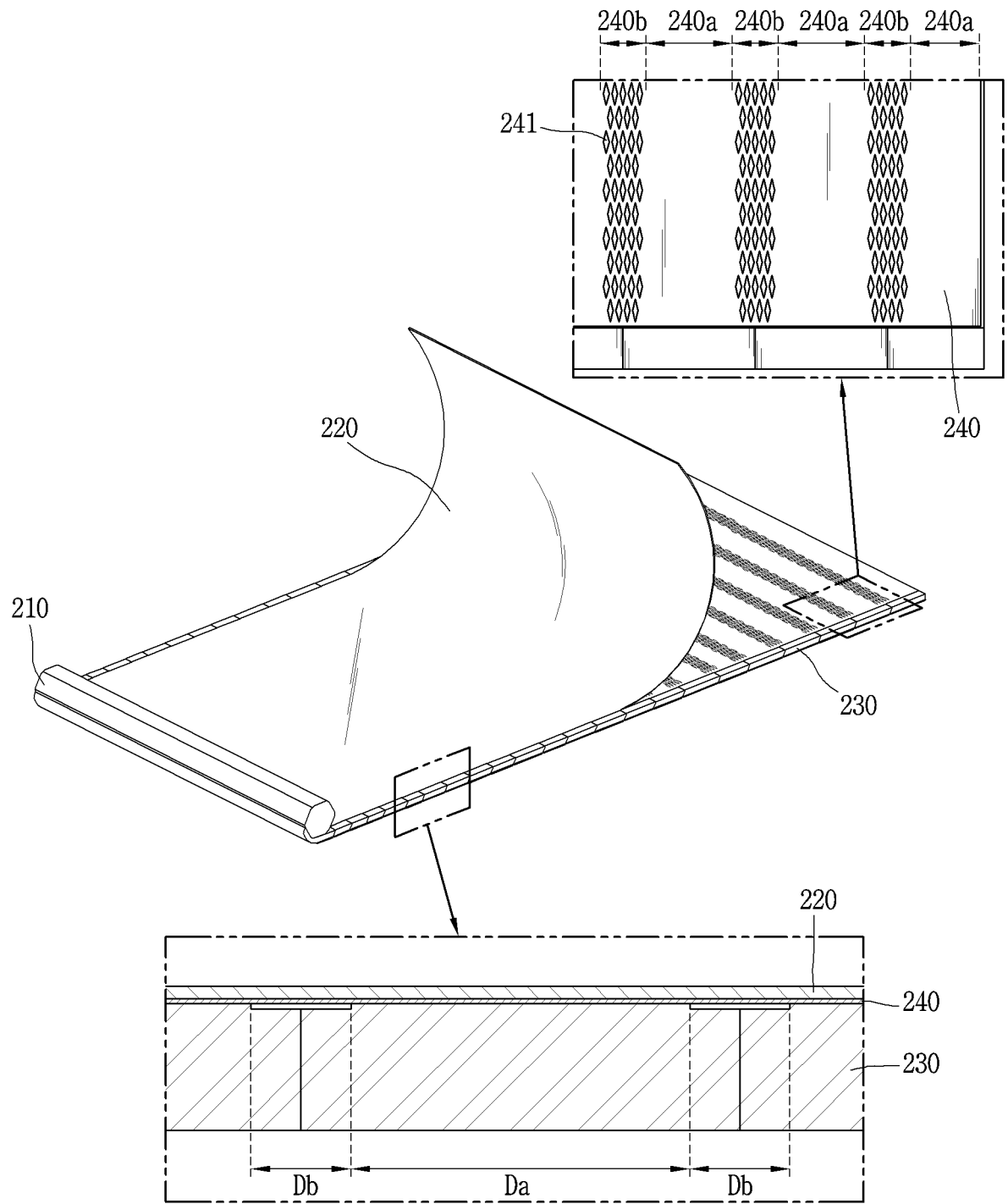
FIG. 8 is a conceptual view illustrating a state in which a rear plate is coupled to a rear surface of the flexible display.

FIG. 8 is a conceptual view illustrating a state in which the rear plate 240 is coupled to the rear surface of the flexible display 220.

The flexible display apparatus 200 according to the present disclosure may further include the rear plate 240.

In a state where the rear plate 240 is attached to the rear surface of the flexible display 220, The flexible display 220 may be rolled or unrolled from the body part 210 together with the rear plate 240 along the outer surface of the body part 210.

The rear plate 240 may be made of a thin superelastic titanium alloy to minimize stress applied by the rear plate 240 that supports the rear surface of the flexible display 220 when the flexible display 220 is in the rolled state.

Here, the superelastic titanium alloy may refer to a material having a yield strain of about 2.0 to 2.5% (based on 0.3 mm thickness). The rear plate 240 may be made of not only the superelastic titanium alloy but also titanium-nickel (Ti—Ni), titanium-aluminum (Ti—Al), or thin-film stainless steel (STS).

Referring to an enlarged portion on a bottom of FIG. 8, a front surface of the rear plate 240 may be closely adhered onto the rear surface of the flexible display 220. The rear plate 240 may be closely adhered onto the rear surface of the flexible display 220 by a thin adhesive layer (not illustrated). Accordingly, the rear plate 240 can be deformed together with the flexible display 220.

In addition, one side of the rear surface of the rear plate 240 may be coupled to the segment plates.

An adhesive region 240a and a non-adhesive region 240b may be alternately formed on the rear surface of the rear plate 240. The adhesive region 240a formed on the rear surface of the rear plate 240 may be coupled to the adhesive portion Da of the segment plate and the non-adhesive region 240b of the rear plate 240 may be disposed to correspond to the non-adhesive portion Db of the segment plate.

In particular, since a plurality of holes 241 are formed at the non-adhesive region 240b of the rear plate 240, fatigue failure due to repeated deformation of the flexible display 220 can be minimized. The plurality of holes 241 may have a honeycomb structure. However, the shape of each hole 241 may be made variously, and an arrangement of the holes 241 may also be arbitrarily selected.

Figure 9:
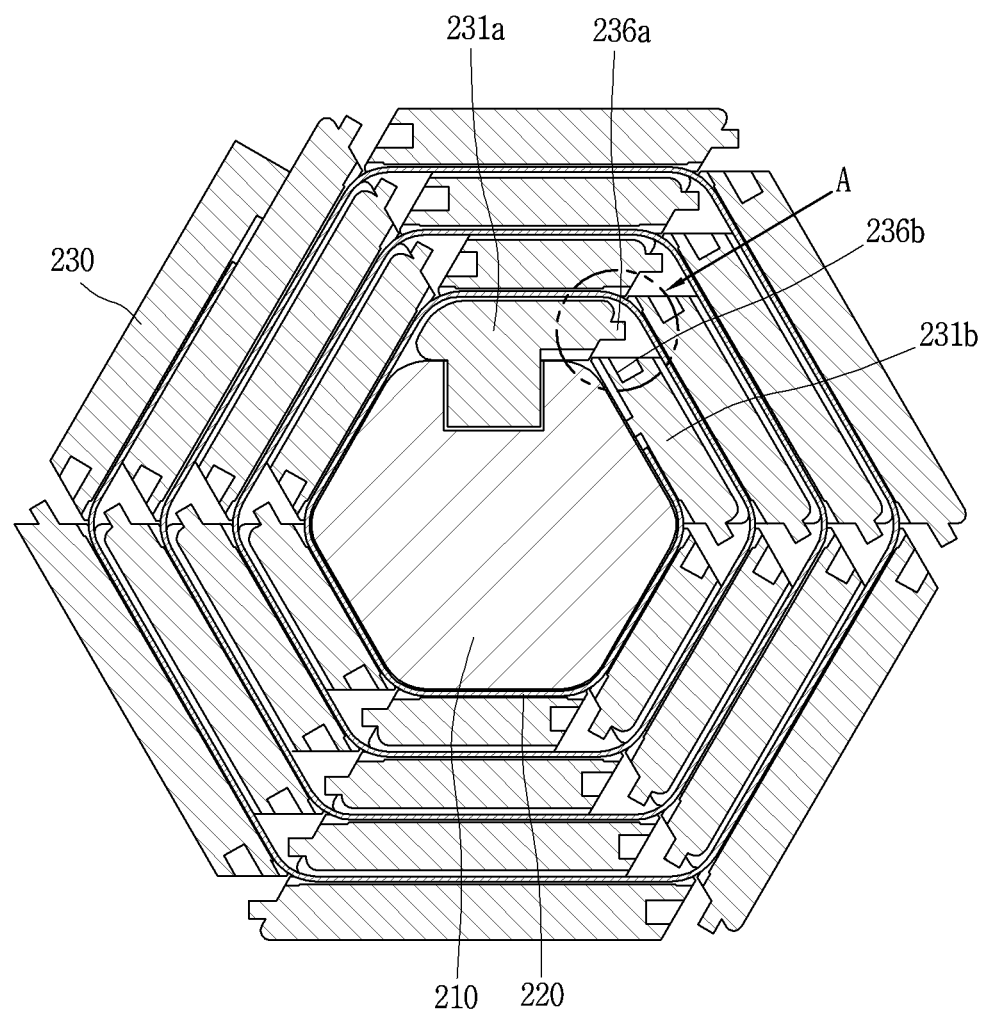
FIG. 9 is a cut cross-sectional view illustrating the flexible display apparatus in a state in which the frame part is rolled on the body part.
Figure 10:
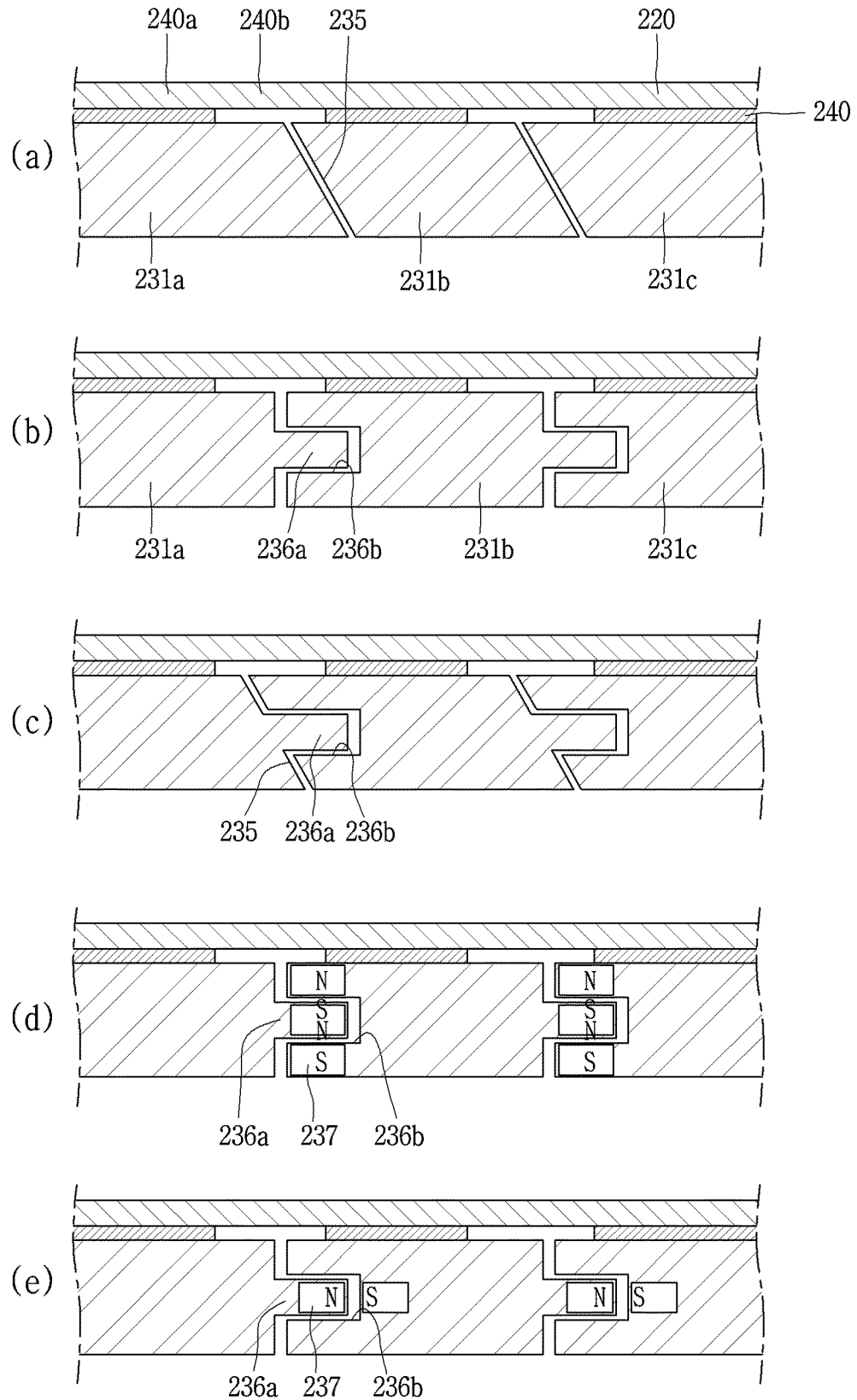
FIG. 10 is a conceptual view illustrating various modifications of segment plates constituting the frame part.

FIG. 9 is a cut cross-sectional view illustrating the flexible display apparatus 200 in a state in which the frame part 230 is rolled on the body part 210 and FIG. 10 is a conceptual view illustrating various modifications of segment plates constituting the frame part 230.

As described above, in the flexible display apparatus 200, when external force is applied to the flexible display 220 while the flexible display 220 is unrolled, the frame part 230 may be rolled on the body part 210 while the flexible display 220 is deformed. Accordingly, the user can keep or carry the flexible display apparatus 200 in the state where the flexible display 220 is rolled on the body part 210. This can secure portability and easy keeping.

In addition, the frame part 230 of the flexible display apparatus 200 according to the present disclosure may include the plurality of segment plates, and the segment plates constituting the frame part 230 may define the rolling parts provided as many as the number of edges defining the body part 210. At this time, the configuration that the rolling part 231, 232, 233, 234 refers to an assembly of segment plates wound in a roll shape along the outer surface of the body part 210 and is provided in plurality disposed outward from the outer surface of the body part 210 has been described above, and thus a description thereof will be omitted within a duplicated range.

As illustrated in (b) of FIG. 10, the frame part 230 of the flexible display apparatus 200 according to the implementation may include the plurality of segment plates. A protrusion 236a may protrude outward from one side of each segment plate and a receiving portion 236b may be recessed into another side of the segment plate. At this time, the protrusion 236a may be inserted into the receiving portion 236b between the segment plates adjacent to each other. In this case, a load can be supported even in the state in which the frame part 230 is unrolled, which can result in acquiring more stable support force and preventing sagging.

As illustrated in (a) of FIG. 10, an inclined surface 235 having a predetermined inclination may be formed on an outer surface of each segment plate. The inclination angle of the inclined surface 235 may be arbitrarily set but may preferably be set to a value of approximately 45 degrees or less.

In this case, the segment plates disposed adjacent to each other may have a structure in which they are in contact with each other by the inclined surface 235. In this case, since the segment plates adjacent to each other with respect to the inclined surface 235 can support each other, sagging can be prevented when the frame part is unrolled.

In addition, as illustrated in (c) of FIG. 10, the inclined surface 235 having the predetermined inclination may be formed on the outer surface of each segment plate, and the segment plates disposed adjacent to each other may be in contact with each other by the inclined surface 235. At the same time, a protrusion 236a may protrude outward from one side of the inclined surface of each segment plate and a receiving portion 236b may be recessed into another side of the segment plate. The protrusion 236a can be inserted into the receiving portion 236b. Therefore, a load can be supported even in the state in which the frame part 230 is unrolled, thereby acquiring more stable support force and preventing sagging.

As illustrated in (d) and (e) of FIG. 10, magnets 237 having different polarities may be disposed at an end portion of the protrusion 236 and at one side of the receiving portion.

The magnets 237, as illustrated in (d) of FIG. 10, may be alternately arranged in a thickness direction of the segment plate. In addition, the magnets 237, as illustrated in (e) of FIG. 10, may be arranged side by side in an extending direction of the segment plates.

Accordingly, in the unrolled state of the frame part 230, the protrusion 236a may be located inside the receiving portion 236b. At this time, a first magnet and a second magnet having different polarities may be located to be adjacent to each other to secure mutual support force such that the frame part 230 can be maintained in a fixed state.

That is, when the flexible display 220 is rolled or unrolled, magnetic force by magnetism may be applied to the protrusion 236 and the receiving portion 236b through the magnets 237 disposed in the segment plates, thereby increasing fixing support force for the frame part 230 and simultaneously obtaining a semi-automatic effect.

The aforementioned flexible display apparatus is not limited to the configurations and the methods of the implementations described above, but all or some of the implementations may be selectively combined so that various modifications can be made.

INDUSTRIAL AVAILABILITY

The present disclosure can be implemented or applied in various ways in the field of a mobile terminal using a flexible display.

The invention claimed is:

1. A flexible display apparatus comprising:
a body part having a shape of a polygonal pillar;
a flexible display deformable by external force; and
a frame part comprising a plurality of segment plates arranged in parallel to one another, and configured to be rolled on or unrolled from an outer surface of the body part while supporting the flexible display,
wherein the segment plates surround the body part to correspond to a rolling radius as the frame part is rolled, and segment plates neighboring each other are in close contact with each other as the frame part is unrolled,
wherein a protrusion protrudes outward from one side of each of the segment plates, and a receiving portion is recessed into another side of the segment plate,
wherein the protrusion is inserted into the receiving portion of a neighboring segment plate,
wherein a first magnet is disposed at an end portion of the protrusion,
wherein a second magnet is disposed at one side of the receiving portion and a third magnet is disposed at another side of the receiving portion,
wherein the protrusion is located in the receiving portion and the first magnet and the second magnet and the third magnet are located adjacent to each other to interact with each other in an unrolled state of the frame part, so that the frame part is fixed, and
wherein the second magnet and the third magnet have different polarities.

2. The flexible display apparatus of claim 1, wherein the segment plates are in close contact with the outer surface of the body part to define a rolled state of the flexible display and spaced apart from the outer surface of the body part to define an unrolled state of the flexible display.

3. The flexible display apparatus of claim 1, wherein the flexible display is configured such that a region exposed to outside is expanded while being unrolled from the body part and the region exposed to the outside is reduced while being rolled on the body part.

4. The flexible display apparatus of claim 1, wherein the frame part comprises rolling parts each having a plurality of segment plates that have a predetermined height and are provided as many as a number of edges of the body part.

5. The flexible display apparatus of claim 1, wherein the body part has a shape of a hexagonal pillar, and the segment plates are rolled on the body part in close contact with the outer surface of the body part.

6. The flexible display apparatus of claim 1, wherein the segment plates are in close contact with the outer surface of the body part as the frame part is rolled on the outer surface of the body part, and
wherein a width of each segment plate in a left and right direction increases in a radial direction in a state where the segment plates are rolled on the body part.

7. The flexible display apparatus of claim 1, further comprising a rear plate coupled to a rear surface of the flexible display to be deformed together with the flexible display.

8. The flexible display apparatus of claim 7, wherein a front surface of the rear plate is closely adhered on the rear surface of the flexible display, and
wherein one side of the rear surface of the rear plate is coupled to the segment plates.

9. The flexible display apparatus of claim 7, wherein an adhesive region and a non-adhesive region are alternately formed on a rear surface of the rear plate.

10. The flexible display apparatus of claim 9, wherein each of the segment plates comprises an adhesive portion coupled to the rear surface of the rear plate and a non-adhesive portion disposed to be spaced apart from the rear surface of the rear plate.

11. The flexible display apparatus of claim 10, wherein the non-adhesive portions are disposed to be adjacent to each other between segment plates neighboring each other.

12. The flexible display apparatus of claim 1, wherein a distance between segment plates neighboring each other changes depending on rolled and unrolled states of the flexible display.

13. The flexible display apparatus of claim 1, wherein an inclined surface having a predetermined inclination is formed on an outer surface of each of the segment plates, and segment plates neighboring each other are arranged to be in contact with each other by the inclined surface.

14. The flexible display apparatus of claim 1, wherein a storage space is defined inside the body part and electronic components are installed in the storage space.

\* \* \* \* \*